(12) United States Patent
Cerny

(10) Patent No.: US 11,709,713 B2
(45) Date of Patent: Jul. 25, 2023

(54) SYSTEM AND METHOD FOR MULTI-TENANT IMPLEMENTATION OF GRAPHICS PROCESSING UNIT

(71) Applicant: Sony Interactive Entertainment LLC, San Mateo, CA (US)

(72) Inventor: Mark E. Cerny, Los Angeles, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 0 days.

(21) Appl. No.: 17/534,316

(22) Filed: Nov. 23, 2021

(65) Prior Publication Data

US 2022/0083385 A1 Mar. 17, 2022

Related U.S. Application Data

(63) Continuation of application No. 16/588,522, filed on Sep. 30, 2019, now Pat. No. 11,182,215.

(51) Int. Cl.
*G06F 9/46* (2006.01)
*G06F 9/50* (2006.01)
*G06F 9/48* (2006.01)
*G06T 1/20* (2006.01)

(52) U.S. Cl.
CPC ............ *G06F 9/5027* (2013.01); *G06F 9/485* (2013.01); *G06F 9/4887* (2013.01); *G06T 1/20* (2013.01)

(58) Field of Classification Search
CPC ...... G06F 9/5027; G06F 9/485; G06F 9/4887; G06T 1/20
See application file for complete search history.

*Primary Examiner* — Gregory A Kessler
(74) *Attorney, Agent, or Firm* — Penilla IP, APC

(57) ABSTRACT

A method for graphics processing, wherein a graphics processing unit (GPU) resource is allocated among applications, such that each application is allocated a set of time slices. Commands of draw calls are loaded to rendering command buffers in order to render an image frame for a first application. The commands are processed by the GPU resource within a first time slice allocated to the first application. The method including determining at least one command has not been executed at an end of the first time slice. The method including halting execution of commands, wherein remaining one or more commands are not processed in the first time slice. A GPU configuration is preserved for the commands after processing a last executed command, the GPU configuration used when processing in a second time slice the remaining commands.

20 Claims, 13 Drawing Sheets

SYSTEM AND METHOD FOR MULTI-TENANT IMPLEMENTATION OF GRAPHICS PROCESSING UNIT

CLAIM OF PRIORITY

This application is a continuation of and claims priority to and the benefit of commonly owned, patent application, U.S. Ser. No. 16/588,522, filed on Sep. 30, 2019, entitled "System and Method For Multi-Tenant Implementation Of Graphics Processing Unit," the disclosure of which is incorporated herein by reference in its entirety for all purposes.

TECHNICAL FIELD

The present disclosure is related to graphic processing, and more specifically for multi-tenant sharing of graphic processing resources between multiple applications.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to network between players for multi-player gaming, sharing of assets between players, sharing of instant experiences between players and/or spectators, allowing friends to watch a friend play a video game, having a friend join the on-going game play of a friend, and the like.

The cloud gaming server may be configured to provide resources to multiple clients and/or applications. That is, the cloud gaming server may be configured with resources capable of high throughput. However, these resources may sit idle for a large percentage of time depending on the amount of resources, the number of applications running, and the speed of those resources. To maximize back-end server utilization and cost efficiency, resources may be shared between multiple applications. For example, graphics processing performed for different applications may be shared between one or more graphics processing units. However, scheduling of those graphics processing units equally is difficult to achieve.

It is in this context that embodiments of the disclosure arise.

SUMMARY

Embodiments of the present disclosure relate to multi-tenancy for real-time applications, and more specifically to sharing of a graphics processing unit (GPU) between multiple applications to perform synchronous operations and/or asynchronous operations.

Embodiments of the present disclosure disclose a method for graphics processing. The method including allocating a GPU resource among two or more applications, such that each application is allocated a set of time slices. The method including loading a plurality of commands of one or more draw calls to one or more rendering command buffers in order to render an image frame for a first application. The method including processing the plurality of commands in the one or more rendering command buffers by the GPU resource within a first time slice being allocated to the first application. The method including determining that at least one of the plurality of commands has not been executed at the end of the first time slice being allocated to the first application. The method including halting execution of the plurality of commands, wherein remaining one or more commands in the plurality of commands are not processed in the first time slice. The method including preserving a GPU configuration for the plurality of commands after processing a last executed command, the GPU configuration used when resuming to process in a second time slice the remaining one or more commands in the plurality of commands.

In another embodiment, a non-transitory computer-readable medium storing a computer program for graphics processing is disclosed. The computer-readable medium including program instructions for allocating a GPU resource among two or more applications, such that each application is allocated a set of time slices. The computer-readable medium including program instructions for loading a plurality of commands of one or more draw calls to one or more rendering command buffers in order to render an image frame for a first application. The computer-readable medium including program instructions for processing the plurality of commands in the one or more rendering command buffers by the GPU resource within a first time slice being allocated to the first application. The computer-readable medium including program instructions for determining that at least one of the plurality of commands has not been executed at the end of the first time slice being allocated to the first application. The computer-readable medium including program instructions for halting execution of the plurality of commands, wherein remaining one or more commands in the plurality of commands are not processed in the first time slice. The computer-readable medium including program instructions for preserving a GPU configuration for the plurality of commands after processing a last executed command, the GPU configuration used when resuming to process in a second time slice the remaining one or more commands in the plurality of commands.

In still another embodiment, a computer system includes a processor, and memory coupled to the processor and having stored therein instructions that, if executed by the computer system, cause the computer system to execute a method for graphics processing. The method including allocating a GPU resource among two or more applications, such that each application is allocated a set of time slices. The method including loading a plurality of commands of one or more draw calls to one or more rendering command buffers in order to render an image frame for a first application. The method including processing the plurality of commands in the one or more rendering command buffers by the GPU resource within a first time slice being allocated to the first application. The method including determining that at least one of the plurality of commands has not been executed at the end of the first time slice being allocated to the first application. The method including halting execution of the plurality of commands, wherein remaining one or more commands in the plurality of commands are not processed in the first time slice. The method including preserving a GPU configuration for the plurality of commands after processing a last executed command, the GPU configuration used when resuming to process in a second time slice the remaining one or more commands in the plurality of commands.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 4B-1 and 4B-2 illustrate GPU resource timing when halting and resuming execution of commands between allocation periods, in accordance with embodiments of the present disclosure.

FIGS. 6D-1 and 6D-2 illustrates the processing of halting execution of the plurality of commands at the end of a time slice, wherein the halting includes performing a hard stop on the execution of the plurality of commands, and resuming processing of remaining commands that have not been processed at a subsequent time slice including portions of commands that have not been processed, in accordance with embodiments of the present disclosure.

DETAILED DESCRIPTION

Figure 1:
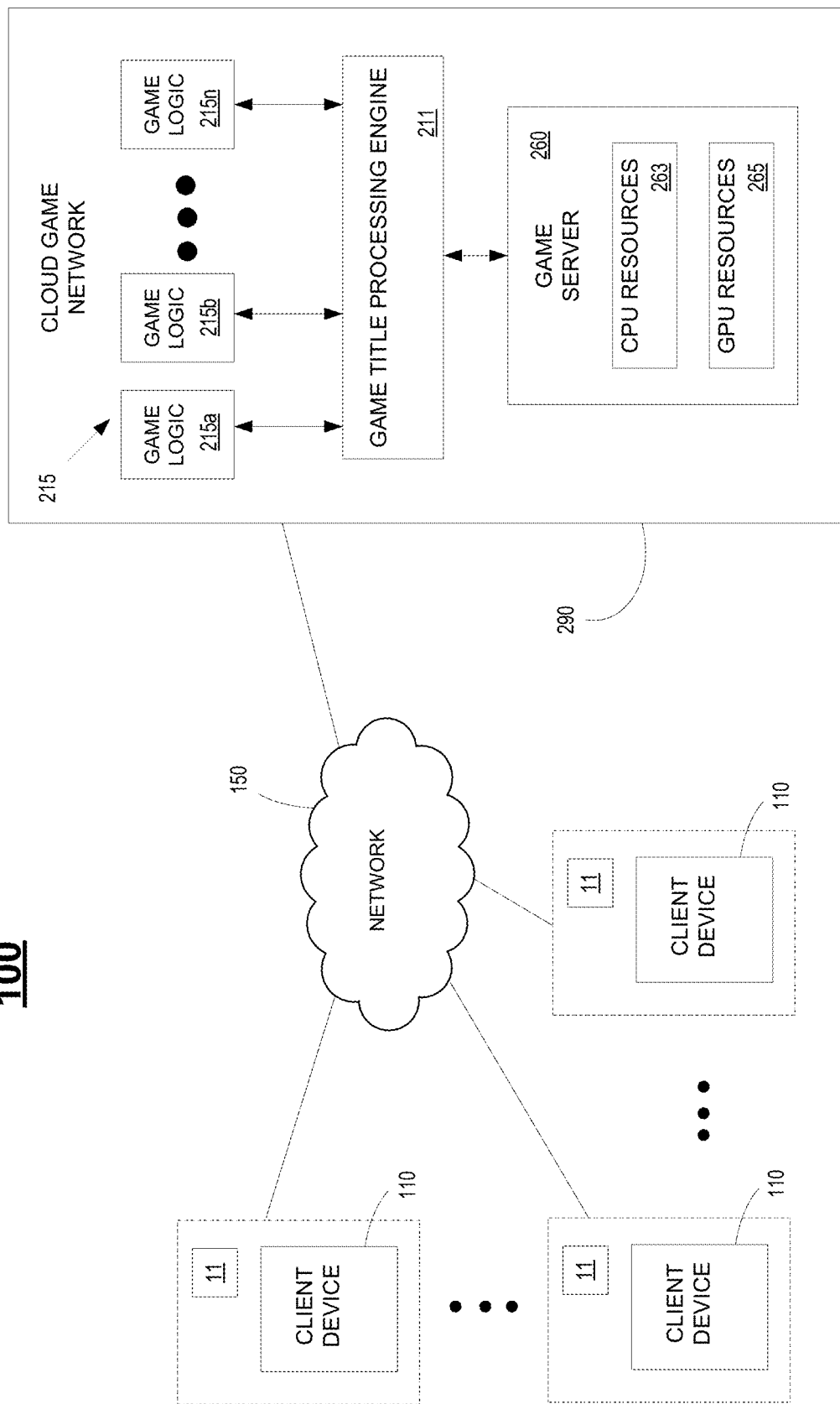
FIG. 1 is a diagram of a system for providing gaming over a network between one or more cloud gaming servers configured for multi-tenancy for serving one or more client devices, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems configured for performing multi-tenancy for real-time applications, and more specifically to sharing of a graphics processing unit (GPU) between multiple applications to perform synchronous operations and/or asynchronous operations. In particular, it is sometimes desirable to share a single GPU (e.g. GPU resource) between multiple real-time applications, e.g. in the context of a cloud gaming server, in embodiments. In other embodiments, one or more GPU resources are shared between one or more applications. In embodiments of the present disclosure, multi-tenancy of real-time applications sharing a GPU resource guarantees each application usage of the GPU for a certain percentage of the time, and also guarantees frequent and predictable access to the GPU. If an application needs more time for rendering than its time slice allows (i.e. extending beyond an allocated period for GPU usage), then once the end of the allocated time slice for an application has been reached, the GPU stops processing new commands for that application from the rendering command buffer(s). Also, all GPU processing for that application as requested by the rendering command buffers(s) (i.e. the multiple objects being rendered and/or the multiple compute kernels being executed) runs to completion. In particular, multiple "hardware contexts" (e.g. GPU configurations) were being used to support these multiple objects and/or compute kernels, but once all processing completes, only one hardware context remains—the configuration of the GPU after rendering of the final object or execution of the final compute kernel. This hardware context is preserved until the next allocated time slice for that application, and is used when resuming processing for that application. In another embodiment, to support long lived asynchronous compute (i.e. asynchronous compute that extends past the end of the rendering), after the GPU processing requested by the rendering command buffers(s) runs to completion, the asynchronous compute requested by the asynchronous command buffer(s) is halted, and its complete state (e.g. compute thread PCs and registers, allocated on-chip buffers, etc.) is saved. At the beginning of the next allocated time slice for the application, the complete state of asynchronous compute is restored, and processing of asynchronous compute should resume.

With the above general understanding of the various embodiments, example details of the embodiments will now be described with reference to the various drawings.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

FIG. 1 is a diagram of a system 100 for providing gaming over a network between one or more cloud gaming servers configured for multi-tenancy for serving one or more client devices, in accordance with one embodiment of the present disclosure. Cloud gaming includes the execution of a video game at the server to generate game rendered video frames, which are then sent to a client for display. In particular, system 100 is configured for multi-tenancy for real-time applications, and more specifically to sharing of a graphics processing unit (GPU) between multiple applications to perform synchronous operations and/or asynchronous operations.

System 100 provides gaming via a cloud game network 290, wherein the game is being executed remote from client device 110 (e.g. thin client) of a corresponding user that is playing the game, in accordance with one embodiment of the present disclosure. System 100 may provide gaming control to one or more users playing one or more games through the cloud game network 290 via network 150 in either single-player or multi-player modes. In some embodiments, the cloud game network 290 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include $5^{th}$ Generation (5G) network technology having advanced wireless communication systems.

As shown, the cloud game network 290 includes a game server 260 that provides access to a plurality of video games. Game server 260 may be any type of server computing device available in the cloud, and may be configured as one or more virtual machines executing on one or more hosts. For example, game server 260 may manage a virtual machine supporting a game processor that instantiates an instance of a game for a user. As such, a plurality of game processors of game server 260 associated with a plurality of virtual machines is configured to execute multiple instances of one or more games associated with gameplays of a plurality of users. In that manner, back-end server support provides streaming of media (e.g. video, audio, etc.) of gameplays of a plurality of gaming applications to a plurality of corresponding users. That is, game server 260 is configured to stream data (e.g. rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g. compressed) and streamed to the corresponding client device for display.

For example, a plurality of users may access cloud game network 290 via communication network 150 using corresponding client devices 110 configured for receiving streaming media. In one embodiment, client device 110 may be configured as a thin client providing interfacing with a back end server (e.g. cloud game network 290) configured for providing computational functionality (e.g. including game title processing engine 211). In another embodiment, client device 110 may be configured with a game title processing engine and game logic for at least some local processing of a video game, and may be further utilized for receiving streaming content as generated by the video game executing at a back-end server, or for other content provided by back-end server support. For local processing, the game title processing engine includes basic processor based functions for executing a video game and services associated with the video game. In that case, the game logic may be stored on the local client device 110 and is used for executing the video game.

Each of the client devices 110 may be requesting access to different games from the cloud game network. For example, cloud game network 290 may be executing one or more game logics that are built upon a game title processing engine 211, as executed using the CPU resources 263 and GPU resources 265 of the game server 260. For instance, game logic 215a in cooperation with game title processing engine 211 may be executing on game server 260 for one client, game logic 215b in cooperation with game title processing engine 211 may be executing on game server 260 for a second client, . . . and game logic 215n in cooperation with game title processing engine 211 may be executing on game server 260 for an Nth client.

In particular, client device 110 of a corresponding user (not shown) is configured for requesting access to games over a communication network 150, such as the internet, and for rendering for display images generated by a video game executed by the game server 260, wherein encoded images are delivered to the client device 110 for display in association with the corresponding user. For example, the user may be interacting through client device 110 with an instance of a video game executing on game processor of game server 260. More particularly, an instance of the video game is executed by the game title processing engine 211. Corresponding game logic (e.g. executable code) 215 implementing the video game is stored and accessible through a data store (not shown), and is used to execute the video game. Game title processing engine 211 is able to support a plurality of video games using a plurality of game logics (e g gaming application), each of which is selectable by the user.

For example, client device 110 is configured to interact with the game title processing engine 211 in association with the gameplay of a corresponding user, such as through input commands that are used to drive gameplay. In particular, client device 110 may receive input from various types of input devices, such as game controllers, tablet computers, keyboards, gestures captured by video cameras, mice, touch pads, etc. Client device 110 can be any type of computing device having at least a memory and a processor module that is capable of connecting to the game server 260 over network 150. The back-end game title processing engine 211 is configured for generating rendered images, which is delivered over network 150 for display at a corresponding display in association with client device 110. For example, through cloud based services the game rendered images may be delivered by an instance of a corresponding game (e.g. game logic) executing on game executing engine 211 of game server 260. That is, client device 110 is configured for receiving encoded images (e.g. encoded from game rendered images generated through execution of a video game), and for displaying the images that are rendered on display 11. In one embodiment, display 11 includes an HMD (e.g. displaying VR content). In some embodiments, the rendered images may be streamed to a smartphone or tablet, wirelessly or wired, direct from the cloud based services or via the client device 110 (e.g. PlayStation® Remote Play).

In one embodiment, game server 260 and/or the game title processing engine 211 includes basic processor based functions for executing the game and services associated with the gaming application. For example, game server 260 includes central processing unit (CPU) resources 263 and graphics processing unit (GPU) resources 265 that are configured for performing processor based functions include 2D or 3D rendering, physics, physics simulation, scripting, audio, animation, graphics processing, lighting, shading, rasterization, ray tracing, shadowing, culling, transformation, artificial intelligence, etc. In addition, the CPU and GPU group may implement services for the gaming application, including, in part, memory management, multi-thread management, quality of service (QoS), bandwidth testing, social networking, management of social friends, communication with social networks of friends, communication channels, texting, instant messaging, chat support, etc. In one embodiment, the game server 260 is configured to perform multi-tenancy GPU functionality, such that one or more applications share one or more GPU resources. In one embodiment, one or more applications share a particular GPU resource. In one embodiment, multiple GPU devices may be combined to perform graphics processing for a single application that is executing on a corresponding CPU.

In one embodiment, cloud game network 290 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 290, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2:
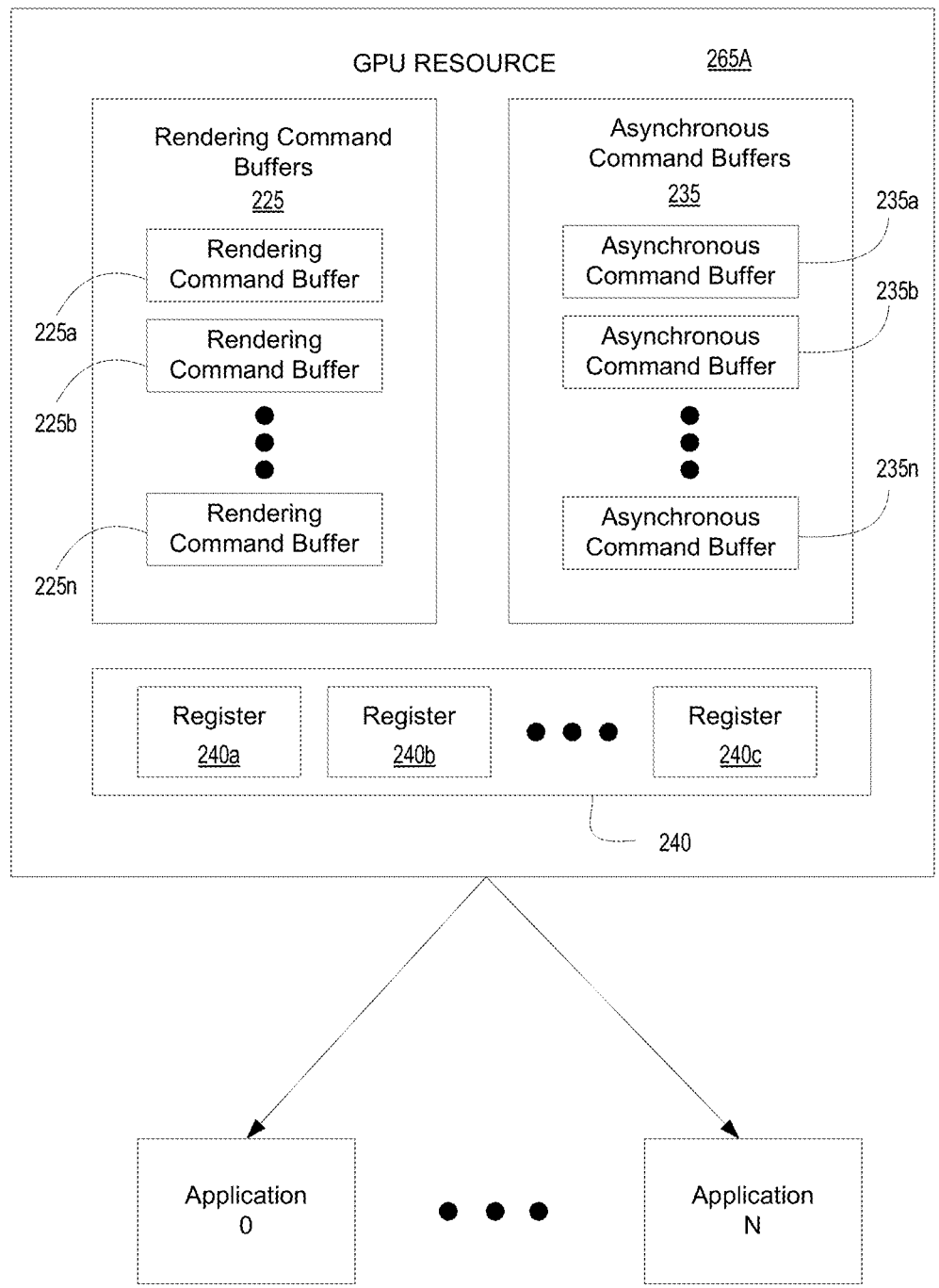
FIG. 2 is a diagram of a graphics processing unit (GPU) resource configured for multi-tenancy servicing one or more applications, in accordance with one embodiment of the present disclosure.

FIG. 2 is a diagram of a GPU resource 265A configured for multi-tenancy servicing one or more real-time applications, in accordance with one embodiment of the present disclosure. For example, GPU resource 265A may be one of the GPU resources 265 in the game server 260 of the cloud game network 290 of FIG. 1. In particular, in one embodiment, game server 260 is configured to perform multi-tenancy GPU functionality, such that one or more applications share one or more GPU resources. In particular, in one embodiment, one or more applications (e.g. Application 0 . . . Application N) share GPU resource 265A, wherein GPU resource 265A may be implementing graphics and/or rendering pipelines for multiple games. That is, the GPU resource 265A is shared between multiple games (e.g. Application 0 . . . Application N) that are being executed by the game server 260.

In one embodiment, a game server 260 may include a CPU and GPU group that is configured to perform multi-tenancy GPU functionality, wherein one CPU and GPU group could be implementing graphics and/or rendering pipelines for multiple games, in one embodiment. That is, the CPU and GPU group is shared between multiple games that are being executed. The CPU and GPU group could be configured as one or more processing devices.

The GPU resource 265A is responsible and/or configured for rendering of objects (e.g. writing color or normal vector values for a pixel of the object to multiple render targets—MRTs) and is configured for execution of synchronous compute kernels (e.g. full screen effects on the resulting MRTs) when performing synchronous compute and the rendering of objects when executing commands from rendering command buffers 225. The GPU resource 265A may also be responsible and/or configured for asynchronous execution of additional compute kernels when performing asynchronous compute operations (e.g. executing commands from asynchronous command buffers 235). This processing of asynchronous compute kernels may be graphics related, but can also be unrelated to graphics, e.g. physics or ray-casting for audio.

As shown in FIG. 2, GPU resource 265A is configured to execute both types of compute kernels including synchronous compute kernels and asynchronous compute kernels using multiple command buffers. In particular, GPU resource 265A is configured to render objects and perform synchronous compute (e.g. during the execution of synchronous compute kernels) when executing commands from the rendering command buffers 225, wherein commands and/or operations may be dependent on other operations such that they are performed in sequence. Also, GPU resource is configured to perform asynchronous compute when executing commands from the asynchronous command buffers 235 to include operations that are not dependent on other synchronous and/or asynchronous operations.

For example, GPU resource 265A is configured to perform synchronous compute when executing synchronous compute kernels and/or rendering of objects using one or more rendering command buffers 225 (e.g. rendering command buffer 225a, rendering buffer 225b . . . rendering command buffer 225n). Performance of synchronous compute (e.g. execute synchronous compute kernels) and rendering of objects are part of the overall rendering. For example, if the video game is running at 60 Hz (e.g. 60 frames per second), then all object rendering and execution of synchronous compute kernels typically must complete within approximately 16.67 ms (e.g. one frame at 60 Hz). As previously described, synchronous operations performed when rendering objects and/or executing synchronous compute kernels are ordered, such that synchronous operations may be dependent on other synchronous operations (e.g. commands in a rendering command buffer may need to complete execution before other commands in that rendering command buffer can execute).

In particular, each of the rendering command buffers 225 contains commands of various types, including commands that affect a corresponding GPU configuration (e.g. commands that specify the location and format of a render target), as well as commands to render objects and/or execute synchronous compute kernels. For purposes of illustration, synchronous compute performed when executing synchronize compute kernels may include performing full screen effects when the objects have all been rendered to one or more corresponding multiple render targets (MRTs).

In addition, when the GPU resource 265A renders objects and/or executes synchronous compute kernels when generating an image frame, the GPU resource 265A is configured via its registers 240 (e.g. register 240a, register 240b . . . register 240n) to perform that rendering or compute kernel execution in a certain way. That is, the values stored in registers 240 define the hardware context (e.g. GPU configuration) for the GPU resource 265A when executing commands in rendering command buffers 225 used for rendering objects and/or executing synchronous compute kernels for an image frame. Some examples of GPU configuration include the location and format of render targets (e.g. MRTs). Also, other examples of GPU configuration include operating procedures. For instance, when rendering an object, the Z-value of each pixel of the object can be compared to the Z-buffer in various ways. For example, the object pixel is written only if the object Z-value matches the value in the Z-buffer. Alternatively, the object pixel could be written only if the object Z-value is the same or less than the value in the Z-buffer. The type of test being performed is defined within the GPU configuration.

Also, GPU resource 265A is configured to perform asynchronous compute to include execution of asynchronous compute kernels using one or more asynchronous command buffers 235 (e.g. asynchronous command buffer 235a, asynchronous command buffer 235b . . . asynchronous command buffer 235n). Each of the asynchronous command buffers 235 contain a mixture of commands, including commands that set up asynchronous compute kernels, and commands to execute them. For purposes of illustration, asynchronous compute may include casting a ray between an audio source and a player location at the request of a CPU to see of that ray strikes any of collision geometry of the gaming world for the video game. Asynchronous compute may not be dependent on other synchronous or asynchronous operations. As previously described, asynchronous compute may not be ordered, such that asynchronous compute may be performed at any time (e.g. commands in one asynchronous command buffer need not wait for another asynchronous command buffer to execute its commands).

Figure 3:
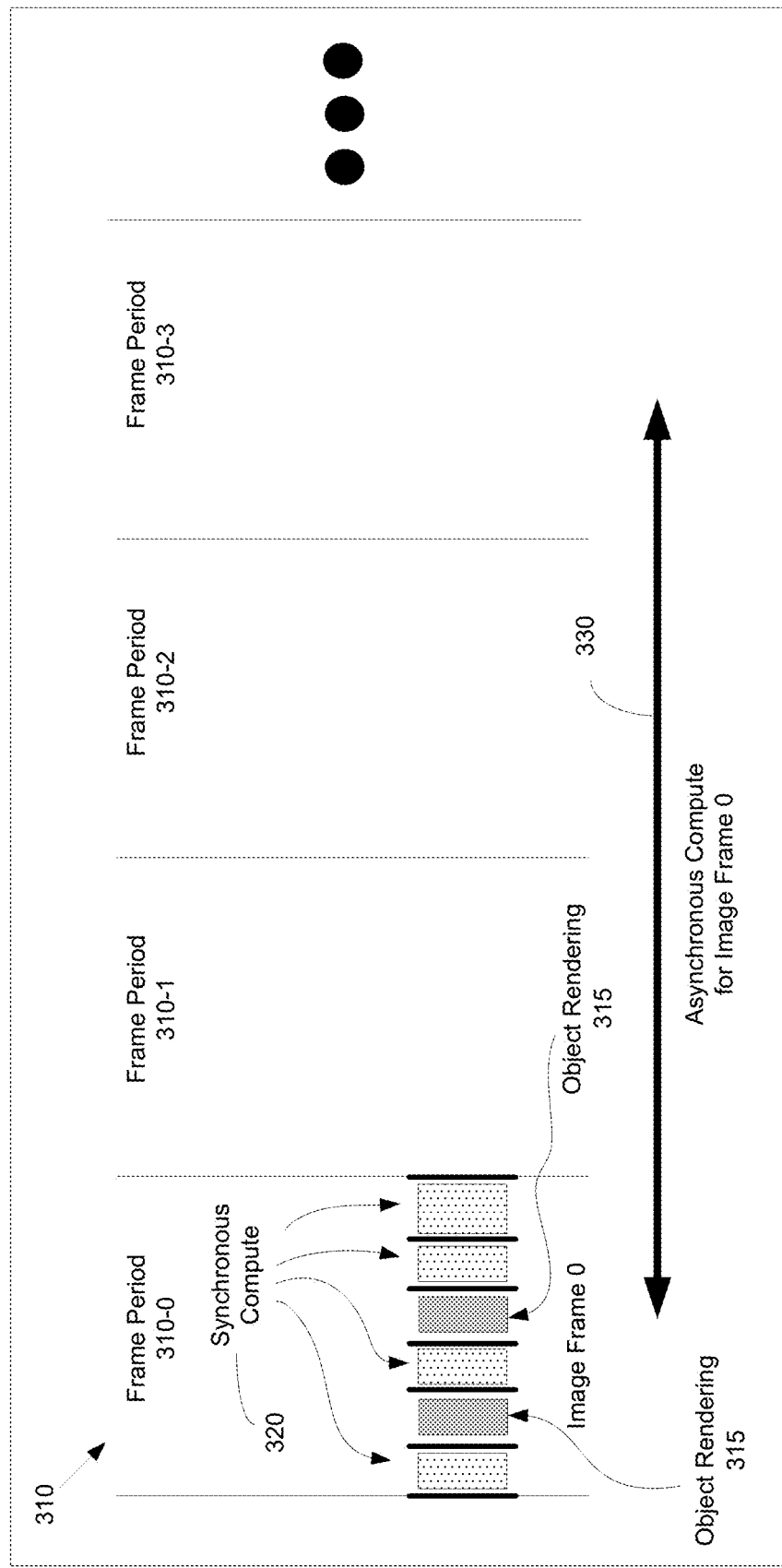
FIG. 3 is a diagram of a GPU resource executing synchronous and asynchronous compute commands for an application over one or more frame periods, in accordance with one embodiment of the present disclosure.

FIG. 3 is a diagram of a GPU resource 265A performing object rendering 315, synchronous compute 320 and asynchronous compute 330 for an application over one or more frame periods 310, in accordance with one embodiment of the present disclosure. FIG. 3 shows multiple frame periods 310, including frame periods 310-0, 310-1, 310-2, 310-3 . . . 310-N.

As previously described, object rendering and/or synchronous compute are performed as part of the rendering of an image frame (e.g. image frame 0), and as such the rendering of objects for that image frame and/or the execution of synchronous compute kernels must be performed within a frame period. For example, object rendering 315 (illustrated as gray blocks) and/or performance of one or more synchronous computes 320 (e.g. rendering of objects and/or execution of one or more synchronous compute kernels and illustrated as dotted blocks) is performed in frame period 310-0 for a corresponding image frame 0. Other object rendering 315 and synchronous computes 320 may be performed in the other frame periods (e.g. 310-1, 310-2 . . . ) but are not shown for clarity.

Asynchronous compute (i.e. the execution of asynchronous compute kernels) may or may not be associated with the rendering of a particular image frame. As such, execution of asynchronous compute 330 may be very long lived (e.g. execution may take 100s of milliseconds). For example, one asynchronous compute 330 may be executed over multiple frame periods. As shown, asynchronous compute 330 may be generated at the same time that image frame 0 is being generated through the CPU and GPU pipeline, but need not be executed to completion in association with image frame 0. As such, asynchronous compute 330 may begin executing in frame period 310-0, continue executing in frame periods 310-1 and 310-2, and complete its execution in frame period 310-3, such that asynchronous compute 330 executes over four frame periods.

In embodiments of the present disclosure, the GPU resource 265A can process many pixels (e.g. when rendering objects for a corresponding image frame) or compute threads (e.g. when executing synchronous compute kernels for the corresponding image frame) in parallel. When the object or synchronous compute kernel is large in size, then the GPU resource 265A may be fully occupied with its processing, but when the object or compute kernel is small then only a portion of the GPU is needed for its processing. In order that the GPU resource 265A stay fully busy, the GPU resource 265A will render multiple objects or execute multiple synchronous compute kernels simultaneously. However, there may be commands that affect the GPU configuration in between rendering commands, such that the objects may require different GPU configurations for their processing. As such, in embodiments the GPU resource 265A is configured to support multiple "hardware contexts," wherein each "hardware context" is a discrete configuration of the GPU. That is, a hardware context is a GPU configuration. The result is that up to a limit, it becomes possible to simultaneously process multiple objects (e.g. for rendering) that require different GPU configurations.

Also, because configuration of an asynchronous compute kernel is much less complex than the configuration required for rendering objects, multiple asynchronous compute kernels can be executed simultaneously without the need for constructs such as "hardware contexts", in embodiments.

Figure 4A:
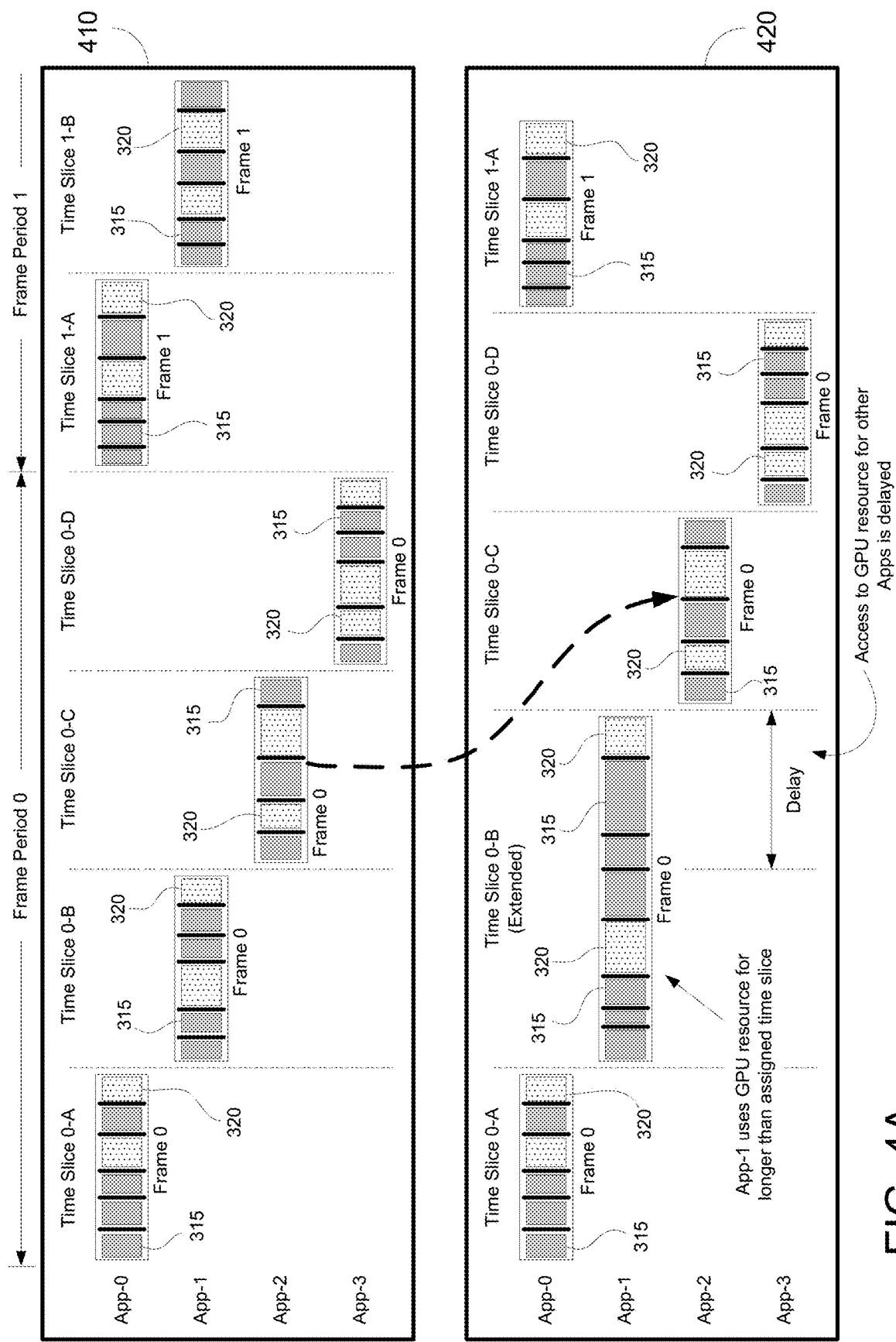
FIG. 4A illustrates GPU resource usage timing when the GPU resource is equally shared between multiple applications, and GPU resource usage timing when an application overruns its GPU resource allocation, in accordance with one embodiment of the present disclosure.

FIG. 4A illustrates GPU resource usage timing when the GPU resource is equally shared between multiple applications, and GPU resource usage timing when an application overruns its GPU resource allocation, in accordance with one embodiment of the present disclosure. In particular, a single GPU resource (e.g. GPU resource 265A) may be configured for multi-tenancy, such that the GPU resource is shared between multiple real-time applications, such as in the context of a cloud gaming server. In some embodiments, one or more GPU resources may be shared between one or more applications.

Because these applications are real-time, it must be ensured that each application not only gets guaranteed usage of the GPU for a certain percentage of the time, but that it also gets frequent and predictable access to the GPU. Block 410 of FIG. 4A illustrates the equal sharing of a GPU resource (e.g. GPU resource 265A of FIG. 2) between four applications (App-0, App-1, App-2, and App-3). That is, at least initially the GPU resource is allocated equally between the four applications. Different methods may be implemented to provide equal allocation of the GPU resource.

For example, every frame period of the GPU resource is divided equally between the four applications, such that each frame period may be split into four equal time slices. As shown in block 410 of FIG. 4A, one frame period (e.g. 16.67 ms when operating at 60 Hz for each of the four applications) may be split into four time slices. For example, when executing commands in rendering command buffers (gray rectangles indicate rendering of objects and dotted rectangles indicate execution of synchronous compute kernels) to generate corresponding image frame 0 for each of the applications, the frame period 0 may include time slice 0-A, time slice 0-B, time slice 0-C, and time slice 0-D. The time slicing is repeated for the next frame period 1 when generating corresponding image frame 1 for each of the applications, etc. In the example where each application operates at 60 Hz, each application uses the GPU resource for approximately 4.167 ms at a time (this is a quarter of a 60 Hz frame). As such, each application is guaranteed to have the GPU resource for 25% (e.g. one-quarter) of the GPU time.

In another embodiment, the time slice may be partitioned by a frame period. In that case, each application is allocated one of these time slices every 16.67 ms (once a 60 Hz frame period. In that manner, GPU access is also frequent and predictable. For example, App-0 is allocated a frame period 0, App-1 is allocated frame period 1, App-2 is allocated frame period 2, and App-3 is allocated frame period 3. This cycle is repeated every four frame periods. For example, in the next four frame periods, App-0 is allocated a frame period 4, App-1 is allocated frame period 5, App-2 is allocated frame period 6, and App-3 is allocated frame period 7, etc.

In still other embodiments, times slices may be allocated to each application equally through various types of partitions. In still other embodiment, time slices may be allocated unequally between applications, such that some application may receive a larger time slice. For example, four applications may each receive one-eighth of the GPU resources, and two applications may each receive one-quarter of the GPU resources, wherein the size of a corresponding time slice (e.g., ⅛ unit) for each of the four applications is one-half the size of a corresponding time slice (e.g., ¼ unit) for each of the two applications.

Strict allocation of the GPU resource is straightforward when image frame generation as specified by the contents of the rendering command buffer (i.e. rendering objects and/or executing synchronous compute kernels to generate an image frame) can always be performed within the defined time slice. However, difficulty in partitioning the GPU resource equally may arise when the processing specified in a corresponding rendering command buffer may extend beyond a corresponding time slice. For example, block 420 illustrates a case where there is only a rendering command buffer (i.e. there is no asynchronous command buffer). There may be processing situations where it is difficult for the applications to ensure that their processing will complete in their allocated time slice. That is, if many objects are visible in a corresponding image frame, then a corresponding application will need more time for rendering. For example, App-1 is generating image frame 0, and as such App-1 may be rendering objects for image frame 0, and/or executing corresponding synchronous compute kernels. However, the processing of the image frame 0 extends beyond the initially allotted time slice (e.g. one-quarter of a frame period—4.167 ms at 60 Hz) because there may be many objects for rendering and/or many synchronous compute kernels to execute.

In this case, access to the GPU resource for the other applications (e.g. App-2 and App-3) may be delayed. For example, the generating and rendering of frame 0 for App 2 has been delayed (e.g. shifted to the right in block 420 of FIG. 4A when compared to its positioning in block 410—see dotted line), and the generating and rendering of frame 0 for App 3 has also been delayed. This delay is propagated to remaining image frames for each of the applications. In that manner, access to the GPU resource by the applications may no longer be frequent and predicable. That is, each of the applications may not be guaranteed access to the GPU resource to continue generating and rendering image frames at 60 Hz.

Figures 1, 4B:
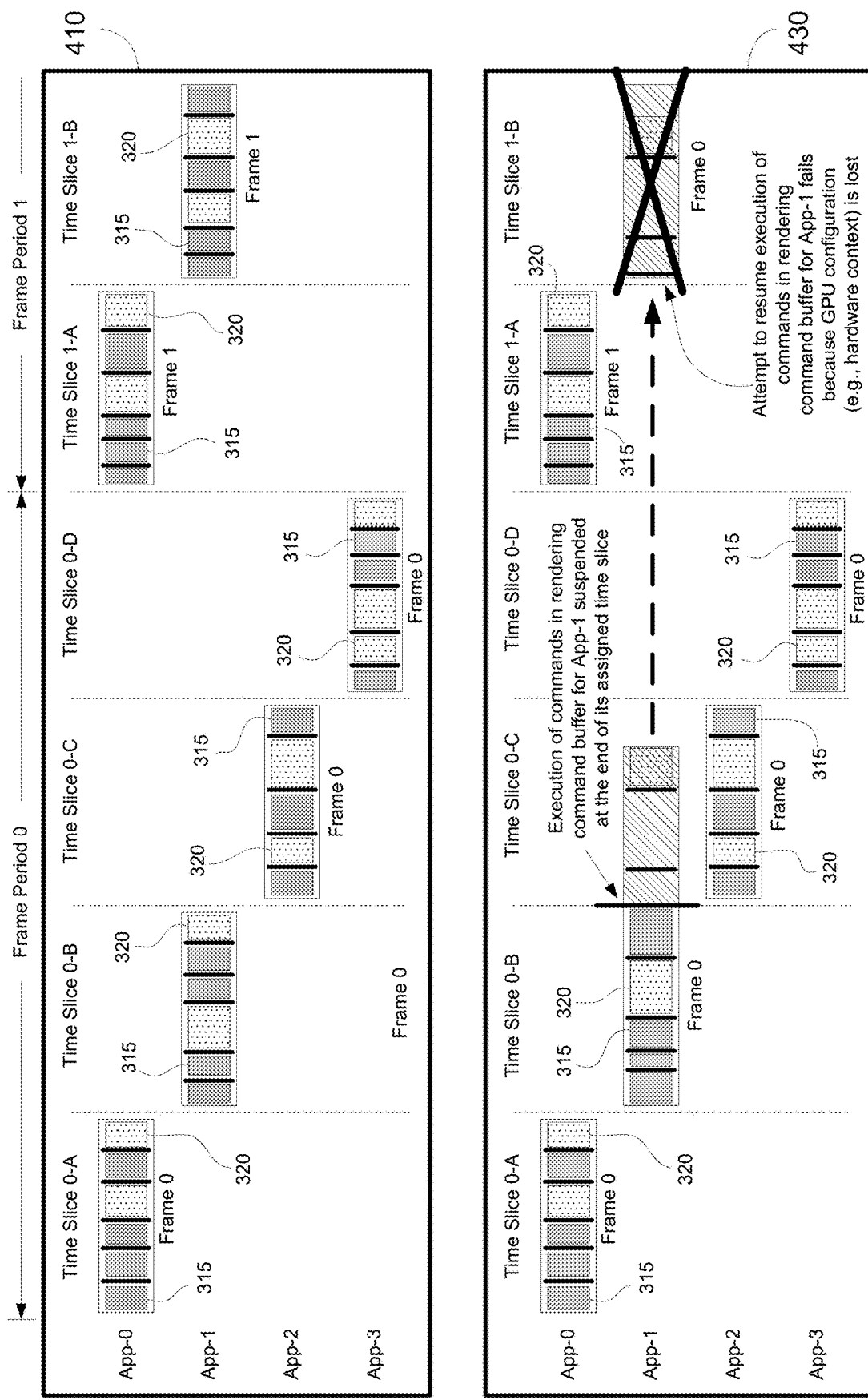
Figures 2, 4B:
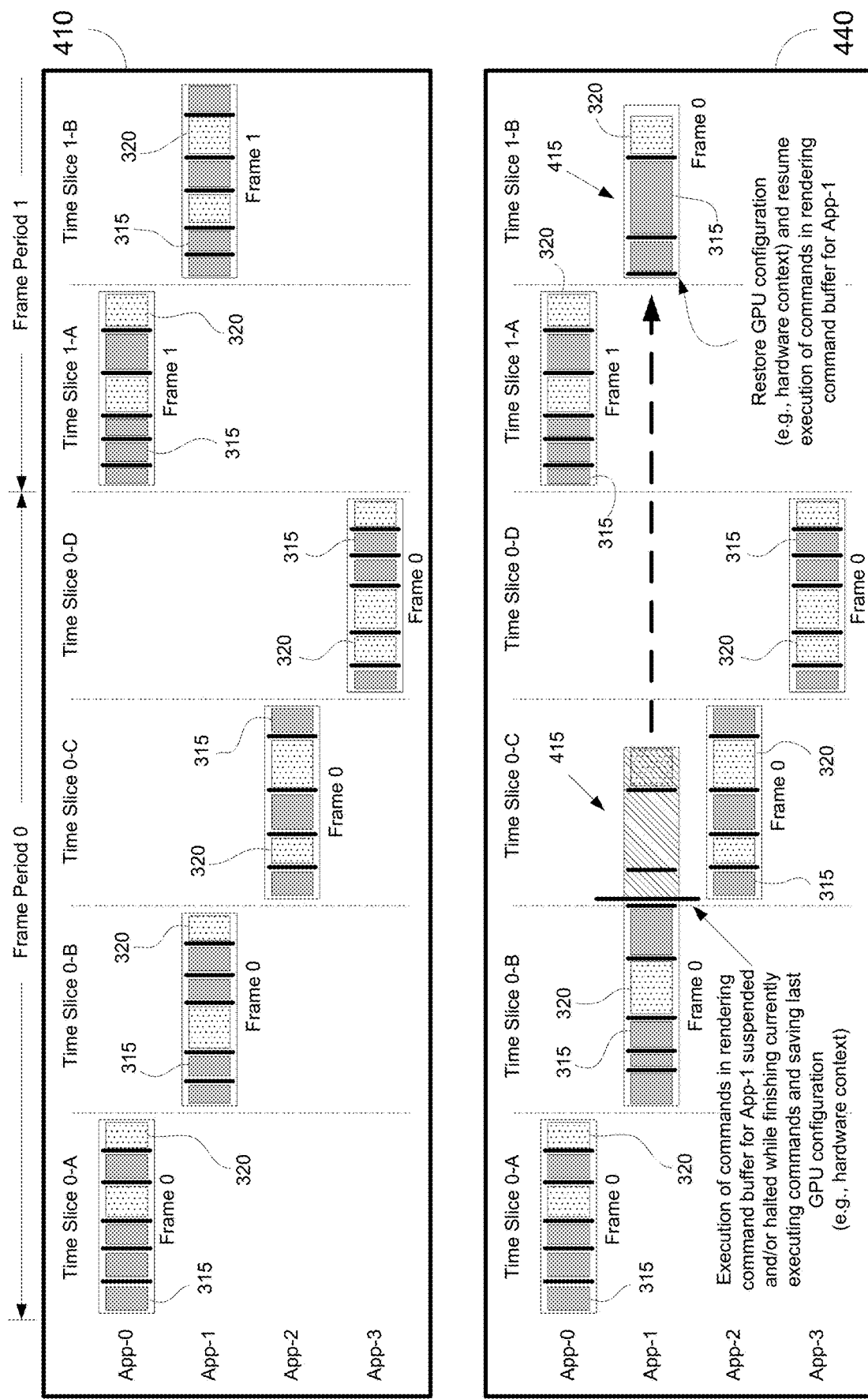

FIGS. 4B-1 and 4B-2 illustrate GPU resource timing when halting and resuming execution of commands in the rendering command buffer between allocation periods, in accordance with embodiments of the present disclosure. In each of FIGS. 4B-1 and 4B-2, block 410 is shown illustrating the equal partitioning of a GPU resource when image frame generation as specified by the contents of the rendering command buffer (e.g. rendering objects and/or executing synchronous compute kernels) for each application supported can always be performed within the defined time slice when implemented in multi-tenancy GPU resource sharing. That is, each application is allocated an equal time slice for every frame period, for example.

FIG. 4B-1 illustrates GPU resource usage timing including the failure to resume the execution of commands from a rendering command buffer when the GPU resource is equally shared between multiple applications, in accordance with one embodiment of the present disclosure. To maintain equal usage of the GPU resource, when an application goes over its allocated time slice within a frame period to generate a corresponding image frame, execution of commands from corresponding rendering command buffers is suspended. In that manner, when GPU processing for each app is suspended at the end of its allocated time slice (i.e. before its rendering completes in some cases) then access to the GPU resource for the other applications is frequent and predictable. However, when the suspended application attempts to resume operations, the resumed rendering of objects and/or synchronous compute kernels will fail (i.e. unable to do so), as the GPU configuration at the time of its suspension will have been lost (e.g. registers may have been written over).

In particular, block 430 of FIG. 4B-1 shows that the processing of the image frame 0 for App-1 extends beyond the initially allotted time slice (e.g. one-quarter of a frame period—4.167 ms at 60 Hz) because there may be many objects for rendering and/or many synchronous compute kernels to execute, as previously described. Because there is a hard suspension, the execution of commands in the rendering command buffer for App-1 is suspended and/or halted at the end of its allocated and/or assigned time slice. In particular, at the end of time slice 0-B in block 430, the rendering of objects and/or the execution of synchronous compute kernels to render image frame 0 for App-1 is halted. Further, the rendering of objects and/or the execution of synchronous compute kernels to render image frame 0 for App-1 is resumed in the next allocated time slice for App-1, which is time slice 1-B. The attempt to resume execution of commands in the rendering command buffer for App-1 fails because the GPU configuration (e.g. hardware context) has been lost.

FIG. 4B-2 illustrates GPU resource usage timing when the GPU resource is equally shared between multiple applications by suspending and/or halting commands for an application at the end of one allocation period and saving a state of a corresponding GPU configuration in order to allow for resuming the execution of the commands from a corresponding rendering command buffer at the next allocation period, in accordance with one embodiment of the present disclosure. To maintain equal usage of the GPU resource, when an application goes over its allocated time slice (e.g. within a frame period) to generate a corresponding image frame, execution of commands from corresponding rendering command buffers are suspended and/or halted. In that manner, access to the GPU resource for the other applications is frequent and predictable. Further, the GPU configuration at the time of suspension is saved so that the resumed rendering of objects and/or synchronous compute kernels can proceed successfully.

In particular, block 440 of FIG. 4B-2 shows that the processing of the image frame 0 for App-1 extends beyond the initially allotted time slice (e.g. one-quarter of a frame period—4.167 ms at 60 Hz), as previously described. In particular, at the end of time slice 0-B in block 430, the rendering of objects and/or the execution of synchronous compute kernels to render image frame 0 for App-1 is suspended and/or halted, wherein remaining commands 415 are not processed in time slice 0-B. Further, the rendering of objects and/or the execution of synchronous compute kernels to render image frame 0 for App-1 is resumed in the next allocated time slice for App-1, which is time slice 1-B in the next frame period 1. Because the GPU configuration (e.g. hardware context) was saved and restored, resumption of execution of commands in the rendering command buffer for App-1 can proceed (e.g., execute remaining commands 415). The process for suspending and resuming the rendering of objects and/or the execution of synchronous compute kernels is described more fully in relation to FIGS. 6A-6C, 6D-1 and 6D-2.

Figure 5:
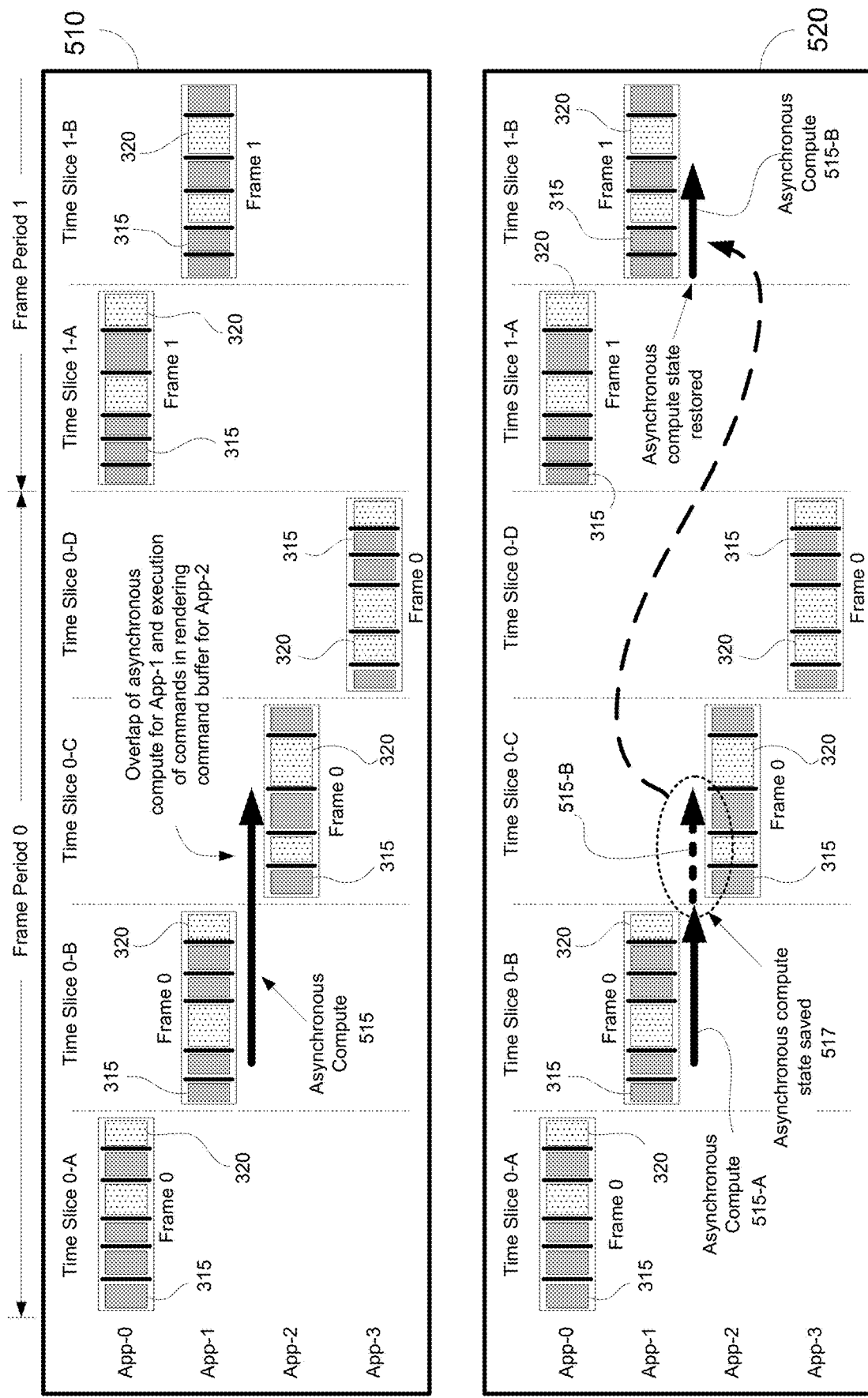
FIG. 5 illustrates GPU resource usage timing when halting and resuming asynchronous compute operations between allocation periods, in accordance with one embodiment of the present disclosure.

FIG. 5 illustrates GPU resource usage timing when halting and resuming asynchronous compute operations between allocation periods, in accordance with one embodiment of the present disclosure. As shown in block 510, there is equal partitioning of a GPU resource when executing commands in the rendering command buffer (e.g. rendering objects and/or executing synchronous compute kernels) for a corresponding image frame for each application. For example, each of the four applications (App-0, App-1, App-2, and App-3) has access to the GPU resource during an assigned time slice of a corresponding frame period. For instance in frame period 0, App-0 has access to the GPU resource in time slice 0-A, App-1 has access in time slice 0-B, App-2 has access in time slice 0-C, and App-3 has access in time slice 0-D. That is, each application is allocated an equal time slice for every frame period when implementing multi-tenancy GPU resource sharing. In addition, the suspension and resuming of rendering of objects and/or the execution of synchronous compute kernels may be implemented within FIG. 5, though not shown, in embodiments.

Consider the case where there are both a rendering command buffer and an asynchronous command buffer that are being executed simultaneously by the GPU resource. Even if the rendering of objects and/or the execution of synchronous compute kernels for a corresponding image frame completes within the allocated time slice, if the asynchronous compute (e.g. execution of asynchronous compute kernels) extends past the allocated time slice for that application, then it may impact the processing of other applications. For example, in block 510, the asynchronous compute 515 (beginning in time slice 0-B during rendering of objects and/or execution of synchronous compute kernels) for App-1 overlaps the execution of commands in one or more rendering command buffers for App-2 (e.g. rendering of objects and/or execution of synchronous compute kernels).

Block 520 illustrates long lived asynchronous compute (i.e. asynchronous compute extending past the end of the rendering of objects and/or execution of synchronous compute kernels for a corresponding image frame) that extends beyond an assigned time slice. For example, the asynchronous compute 515 has been split into asynchronous compute 515-A and 515-B. In particular, after the GPU processing requested by the one or more rendering command buffers used for rendering a corresponding image frame is halted and wherein currently executing commands run to completion, the asynchronous compute 515 requested by the asynchronous command buffer(s) should also be halted, in one embodiment. In another embodiment, asynchronous compute 515 is halted when the rendering of objects and/or execution of synchronous compute kernels for a corresponding image frame has fully completed. In either case, the asynchronous compute is halted, such that asynchronous compute 515-A has been processed and halted, and asynchronous compute 515-B is not processed during the time slice allocated to the corresponding application (e.g. time slice 0-B for App-1). In addition, the complete state (e.g. compute threads PCs and registers, allocated on-chip buffers, etc.) associated with the execution of the asynchronous compute 515 should be saved.

At the beginning of the next allocated time slice for the application (e.g. time slice 1-B for App-1), the complete state 517 of asynchronous compute 515 should be restored, and its processing should resume. That is, in time slice 1-B, the asynchronous compute state 517 is restored, and the remaining portion of asynchronous compute 515-B should resume execution using the saved state.

Figure 6A:
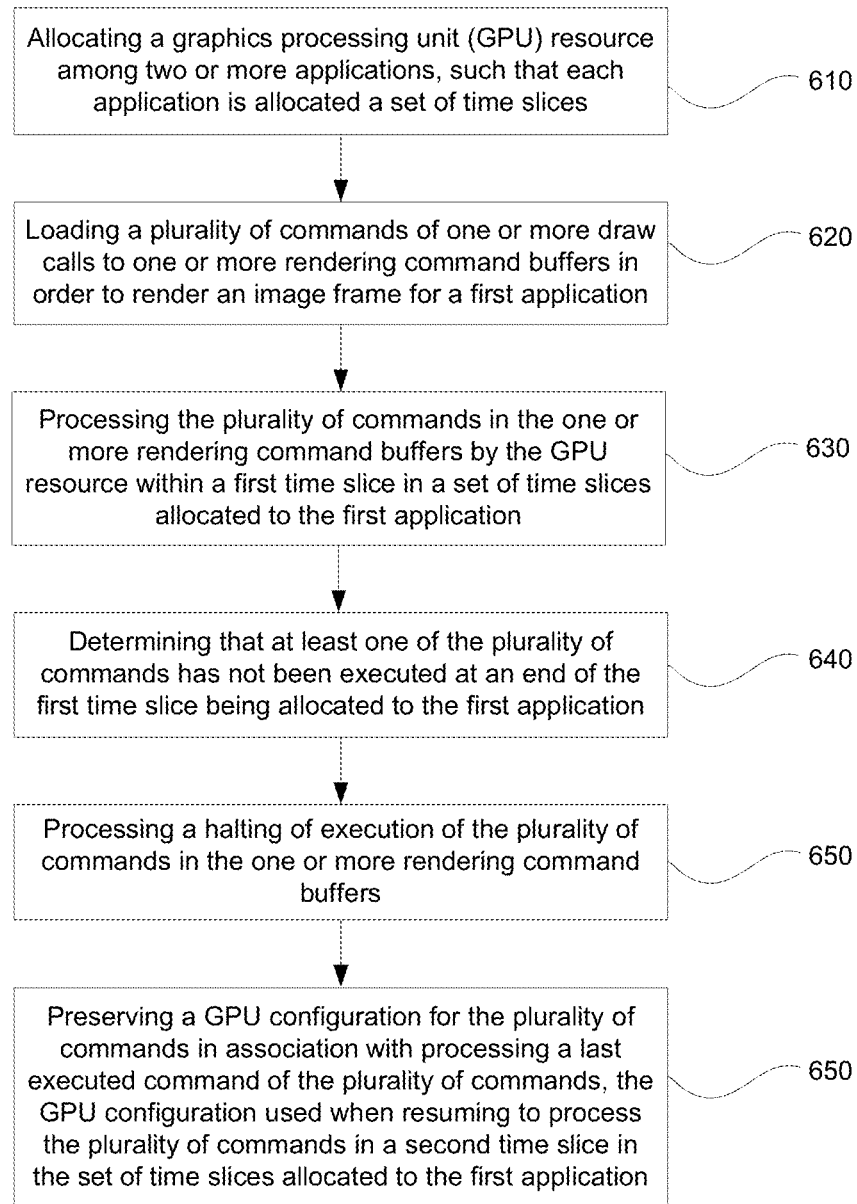
FIG. 6A is a flow diagram illustrating a method for graphics processing, wherein a GPU resource is shared between multiple applications, in accordance with one embodiment of the present disclosure.

With the detailed description of the cloud game network 290 (e.g. in the game server 260) and the GPU resources of FIGS. 1 and 2, flow diagram 600 of FIG. 6A illustrates a method for graphics processing when implementing multi-tenancy for real-time applications, in accordance with one embodiment of the present disclosure. In that manner, a GPU resource may be shared between multiple applications to perform rendering of objects and/or synchronous compute operations and/or asynchronous compute operations.

At 610, a GPU resource is allocated among two or more applications. Each application is allocated a corresponding set of time slices. In one example, a corresponding time slice for each application is equal in time, such that each frame period is partitioned into approximately equal time slices for the two or more applications. In another example, each application may be allocated a full frame period in cyclic fashion. In still another example, each application may be allocated one or more full frame periods in cyclic fashion. In that manner, each application is guaranteed usage of the GPU resource for a certain percentage of the time, and each application is guaranteed frequent and predictable access to the GPU resource.

At 620, a plurality of commands of one or more draw calls is loaded to one or more rendering command buffers in order to render a corresponding image frame for a corresponding application (e.g. a first application). In one example, the CPU generates one or more draw calls for an image frame, wherein the draw calls include commands placed into one or more rendering command buffers for execution by a corresponding GPU resource of the game server 260 in a graphics pipeline. In another example, the CPU may request the GPU to generate all or some of the draw calls.

At 630, the plurality of commands in the one or more rendering command buffers is processed by the GPU resource within a first time slice in a set of time slices allocated to the corresponding application (e.g. first application). For example, the commands in the one or more rendering command buffers are executed, such that objects are rendered and/or synchronous compute kernels are executed in order to render a corresponding image frame.

At 640, at least one of the plurality of commands is determined to have not been executed at an end of the time slice being allocated to the corresponding application (e.g. first application). In particular, in some cases the rendering of objects and/or the execution of synchronous compute kernels is computationally intensive, and extends beyond the time slice assigned to the corresponding application. In order to guarantee equal access of the GPU resource as well as frequent and predictable access to the GPU resource for each application, the execution of commands in the one or more rendering command buffers is suspended at the end of the time slice assigned to the corresponding application.

That is, once the end of the assigned or allocated time slice for the corresponding application has been reached, the GPU resource halts execution of new commands for that application from the one or more rendering command buffers when rendering the corresponding image frame. In one embodiment, at the end of the allocated time slice, the GPU halts the processing of new commands but the commands in flight (e.g. the objects and compute kernels being processed) will take time to run to completion. In particular, at 650 a halting of execution of the plurality of commands in the one or more rendering command buffers is processed. In one embodiment, execution of new commands is halted but currently executing commands are processed to completion, such that associated one or more objects are fully rendered and associated one or more synchronous compute kernels are fully executed. As such, remaining one or more commands (e.g., new commands) in the plurality of commands are not processed in the first frame period. In another embodiment, currently executed commands in the one or more rendering command buffers are processed to completion. In addition, at least one remaining command that has not been processed (e.g., did not begin execution before the end of the allocated time slice) is processed to completion. In still another embodiment, currently executed commands are halted (e.g., hard stop) at the end of the time slice, wherein remaining commands that have not been processed resume processing in a subsequent time slice allocated to the corresponding application. Halting execution of the plurality of commands in the first time slice enables a second application to process commands of one or more rendering command buffers during a subsequent time slice and later returning to process the remaining one or more commands during one or more additional time slices that are allocated to the first application.

One or more "hardware contexts" (e.g. GPU configurations) were being used to during the execution of the commands in the one or more rendering command buffers. However, once all processing is suspended such that currently executing commands are processed to completion, as previously described, only one hardware context remains. This hardware context is associated with the configuration of the GPU resource after rendering of the last or final object or the execution of the last or final synchronous compute kernel.

In order to successfully resume execution of the remaining commands of the one or more rendering command buffers that were not processed in the first frame period, the last hardware context is preserved until the next allocated time slice for that application, and is used when resuming processing for that application. In particular, at 660, a GPU configuration for the plurality of commands is preserved after processing a last currently executing command. The GPU configuration that is preserved is used when resuming to process the plurality of commands in a second time slice in the set of time slices allocated to the corresponding application. In particular, one or more remaining commands in the plurality of commands are processed by the GPU resource in at least the second time slice, wherein the one or more remaining commands in the one or more rendering command buffers were not processed in association with the first time slice to render the corresponding image frame. Specifically, during the second time slice, the GPU resource is configured using the stored GPU configuration before processing the one or more remaining commands. In that manner, preserving the GPU configuration includes a hardware context for the GPU resource and enables return to continue process of the remaining one or more commands while using the hardware context for the GPU resource that was built up during the processing of the plurality of commands in the one or more rendering command buffers during the first time slice. FIGS. 6B, 6C, 6D-1 and 6D-2 illustrate variations in processing a halting of the execution of the plurality of commands at the end of a corresponding time slice for a corresponding application.

In one embodiment, at the end of the allocated time slice, the GPU stops processing new commands but the commands in flight (e.g. the rendered objects and synchronous compute kernels being processed) will take time to run to completion, as previously described. That is, the one or more objects currently being rendered and/or the one or more synchronous compute kernels currently being executed run to completion. In that case, the corresponding application will take more time than its assigned or allocated time slice to run the commands in flight to completion. That is, the time to render the one or more objects currently being rendered and/or to execute the one or more synchronous compute kernels currently being executed runs over the assigned time slice. As such, an extended time period is determined during which the currently executing commands are processed to completion, the extended time period extending beyond the time slice of the first frame period being allocated to the first application. In one embodiment, in order to guarantee each application a fixed percentage of the GPU resource (e.g. equal access to the GPU resource), the time period for the subsequent time slice for the corresponding application (e.g. in the next frame period) may be reduced by the amount by which it ran over in the previous time slice. For example, a time slice of the second frame period is reduced by approximately the extended time period, the time slice of the second frame period being allocated to the first application and used for processing the remaining commands. In other embodiments, the time periods for several subsequent time slices are reduced, the total reduction of these several subsequent time slices equaling the amount by which it ran over in the previous time slice (e.g. the first time slice).

It is not necessary to increase the number of supported hardware contexts, in one embodiment. However, in another embodiment, it may be desirable to increase the number of hardware contexts (e.g. increase the number of supported GPU contexts by N−1). For example, if M hardware contexts are optimal when using the GPU resource to support a single application, and it is desired that N applications will share the GPU resource, then the number of supported hardware contexts may be increased to M+N−1, such that each of the one or more applications has a corresponding supported hardware context that can be stored and later accessed for resumption of suspended rendering of objects and/or execution of synchronous compute kernels when rendering a corresponding image frame. In that manner, GPU configurations may be stored for each of the one or more applications that have exceeded a corresponding time slice when executing corresponding commands for a corresponding image frame.

Figure 6B:
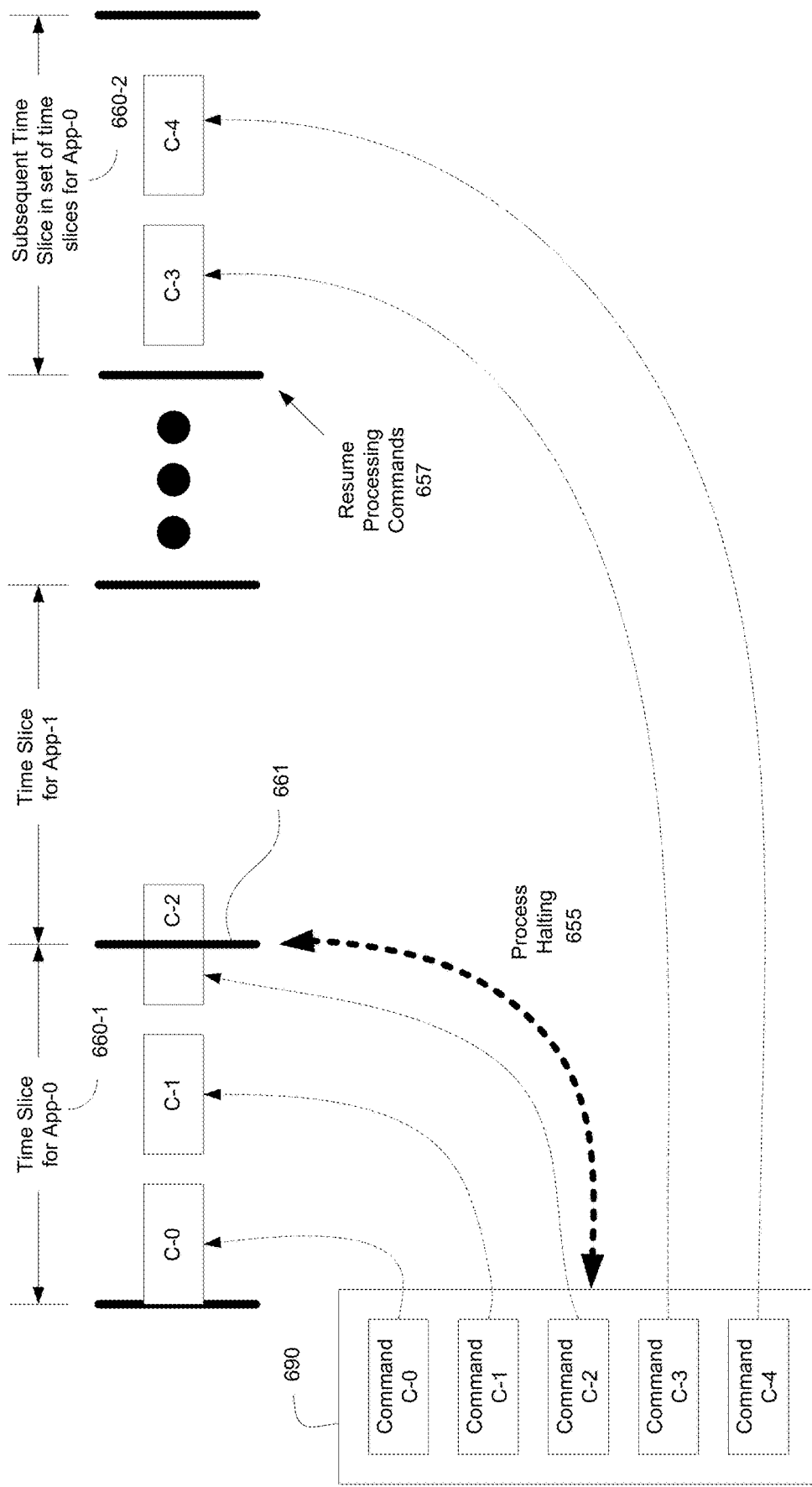
FIG. 6B illustrates the processing of halting execution of the plurality of commands at the end of a time slice, wherein the halting includes executing currently executing commands to completion and resuming the execution of the plurality of commands at a subsequent time slice, in accordance with one embodiment of the present disclosure.

FIG. 6B illustrates the processing of halting execution of a plurality of commands at the end of a time slice of operation 650 of FIG. 6A, wherein the halting includes executing currently executing commands to completion and resuming the execution of the plurality of commands at a subsequent time slice, in accordance with one embodiment of the present disclosure. For purposes of illustration only one rendering command buffer 690 is shown to illustrate the processing of halting execution of the plurality of commands, though it is understood that one or more rendering command buffers may be used to generate a corresponding image frame. Specifically, a rendering command buffer 690 includes five commands (e.g., commands C-0 through C-4) used for rendering objects and/or executing synchronous compute kernels when rendering a corresponding image frame for a corresponding application (e.g., App-0). In particular, a set of time slices 660 is assigned to App-0. For example, the set of time slices 660 for App-0 includes time slice 660-1, time slice 660-2 . . . time slice 660-N (not shown). Other time slices for other applications are interleaved within the set of time slices 660 for App-0 to provide defined, and frequency and predictable access to the GPU used for processing commands. For example, a time slice for App-1 is provided after time slice 660-1 for App-0.

At the end 661 of the time slice 660-1 for App-0, a process 655 of halting execution of the plurality of commands used for generating a corresponding image frame is performed. Specifically, currently executing commands are processed to completion, and remaining commands are not processed in the first time slice or in association with the first time slice. As shown, command C-0 and command C-1 are fully executed in time slice 660-1 for App-0, and command C-2 is currently executing at the end 661 of the time slice 660-1. As such, currently executing command C-2 executes to completion, wherein the execution extends past the end 661 of the time slice 660-1, and extends into the time slice allocated for App-1. Remaining commands C-3 and C-4 have not been processed. A GPU configuration is preserved in association with processing a last executed command from the plurality of commands, wherein the last executed command is command C-2. As such, the hardware context of the corresponding GPU resource used for executing the plurality of commands is preserved after execution of command C-2. The GPU configuration that is preserved is restored before commands are executed during the subsequent time slice 660-2 in the set of time slices allocated to App-0. As such, the GPU configuration is used when resuming to process (operation 657) in the subsequent time slice 660-2 one or more remaining commands (i.e., commands C-3 and C-4) in the plurality of commands that have not been processed inassociation with time slice 660-1.

Figure 6C:
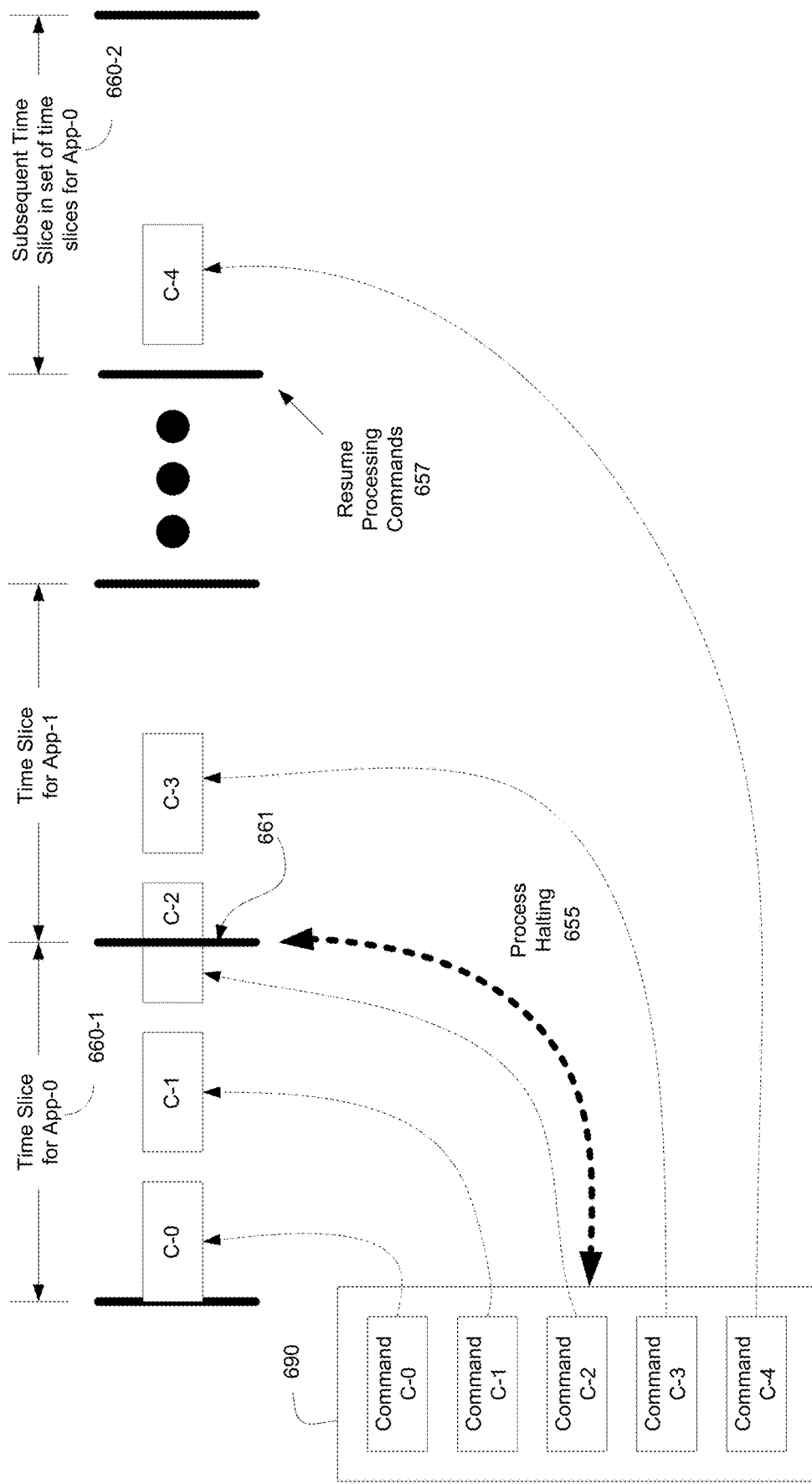
FIG. 6C illustrates the processing of halting execution of the plurality of commands at the end of a time slice, wherein the halting includes executing currently executing commands to completion, executing at least one remaining command, and resuming processing of remaining commands that have not been processed at a subsequent time slice, in accordance with one embodiment of the present disclosure.

FIG. 6C illustrates the processing of halting execution of the plurality of commands at the end of a time slice, wherein the halting includes executing currently executing commands to completion, executing at least one remaining command, and resuming processing of remaining commands that have not been processed at a subsequent time slice, in accordance with one embodiment of the present disclosure. As previously described in relation to FIG. 6B, rendering command buffer 690 includes five commands (e.g., commands C-0 through C-4) used for rendering objects and/or executing synchronous compute kernels when rendering a corresponding image frame for a corresponding application (e.g., App-0). The set of time slices 660 for App-0 includes time slice 660-1, time slice 660-2 . . . time slice 660-N (not shown). Other time slices for other applications are interleaved within the set of time slices 660 for App-0 to provide defined, and frequency and predictable access to the GPU used for processing commands.

At the end 661 of the time slice 660-1 for App-0, a process 655 of halting execution of the plurality of commands used for generating a corresponding image frame is performed. Specifically, currently executing commands are processed to completion, wherein the currently executing commands begin execution during time slice 660-1 and finish execution beyond the end 661 of the time slice 660-1. Remaining commands in the plurality of commands are not processed in time slice 660-1 for App-0, wherein remaining commands also did not begin execution during time slice 660-1 for App-0. As shown in FIG. 6C, after execution of command C-2, at least one other remaining command is immediately executed, such as executing command C-3. That is, during the process 655 of halting execution of the plurality of commands, the halting is performed after executing one or more remaining commands. For example, command C-3 is processed to completion immediately after processing the currently executed commands (e.g., command C-2) to completion. Also, command C-3 is the last executed command, of the commands executed in association with time slice 660-1 for App-0. A GPU configuration is preserved in association with processing the last executed command from the plurality of commands, wherein the last executed command is command C-3. As such, the hardware context of the corresponding GPU resource used for executing the plurality of commands is preserved after execution of command C-3. The GPU configuration that is preserved is restored before commands are executed during the subsequent time slice 660-2 in the set of time slices allocated to App-0. As such, the GPU configuration is used when resuming to process (operation 657) in the subsequent time slice 660-2 one or more remaining commands (i.e., command C-4) in the plurality of commands that have not been processed in association with time slice 660-1.

Figures 1, 6D:
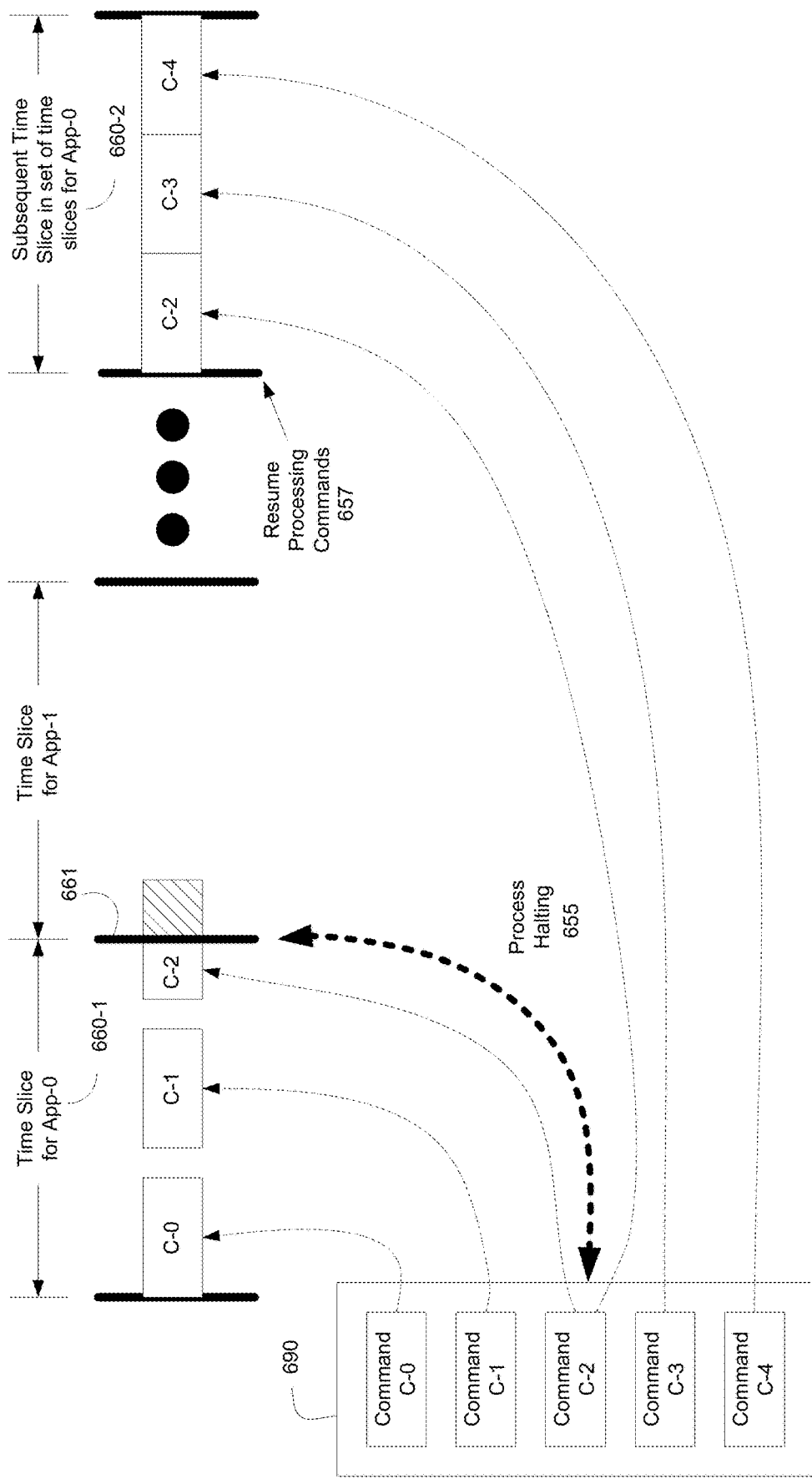
Figures 2, 6D:
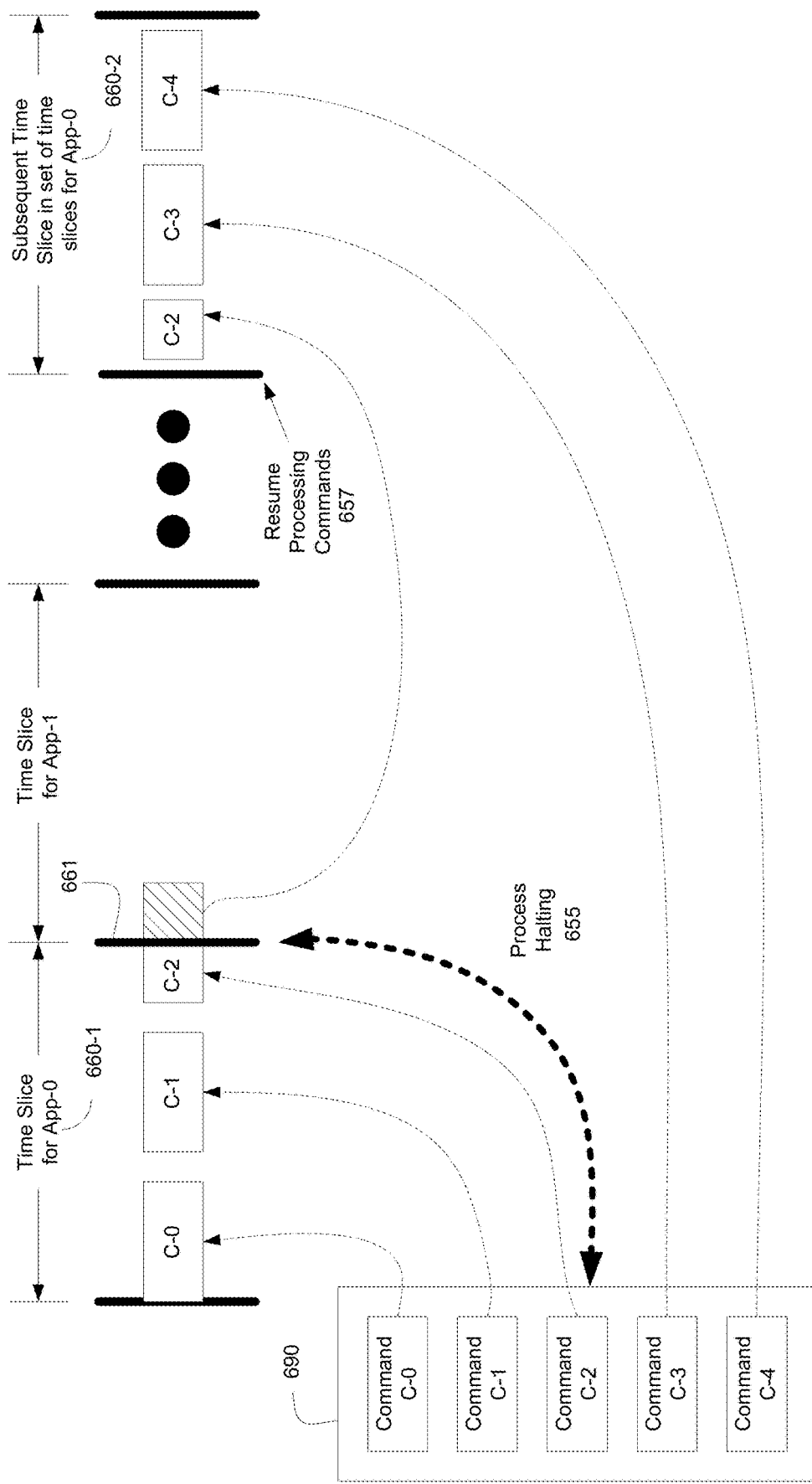

FIG. 6D-1 illustrates the processing of halting execution of the plurality of commands at the end of a time slice, wherein the halting includes performing a hard stop on the execution of the plurality of commands, in accordance with one embodiment of the present disclosure. Processing is resumed for remaining commands that have not been processed in a subsequent time slice, wherein currently executed commands that are halted are executed from the beginning in the subsequent time slice. As previously described in relation to FIG. 6B, rendering command buffer 690 includes five commands (e.g., commands C-0 through C-4) used for rendering objects and/or executing synchronous compute kernels when rendering a corresponding image frame for a corresponding application (e.g., App-0). The set of time slices 660 for App-0 includes time slice 660-1, time slice 660-2 . . . time slice 660-N (not shown). Other time slices for other applications are interleaved within the set of time slices 660 for App-0 to provide defined, and frequency and predictable access to the GPU used for processing commands.

At the end 661 of the time slice 660-1 for App-0, a process 655 of halting execution of the plurality of commands used for generating a corresponding image frame is performed. Specifically, execution of the plurality of commands in the one or more rendering command buffers (e.g., buffer 690) is halted (e.g., perform a hard stop). As shown, commands C-0 and C-1 are executed to completion in time slice 660-1 for App-0. On the other hand, command C-2 is currently executing at the end 661 of time slice 660-1, and is not completed. Command C-2 will resume processing from the beginning at the subsequent time slice 660-2. As such, a GPU configuration is preserved in association with processing the last executed command from the plurality of commands, wherein the last executed command is command C-1. As such, the hardware context of the corresponding GPU resource used for executing the plurality of commands is preserved after execution of command C-1. The GPU configuration that is preserved is restored before commands are executed during the subsequent time slice 660-2 in the set of time slices allocated to App-0. As such, the GPU configuration is used when resuming to process (operation 657) in the subsequent time slice 660-2 one or more remaining commands (i.e., commands C-2, C-3, and C-4) in the plurality of commands that have not been processed in association with time slice 660-1. In particular, command C-2 is executed from the beginning during the subsequent time slice 660-2.

FIG. 6D-2 illustrates the processing of halting execution of the plurality of commands at the end of a time slice, wherein the halting includes performing a hard stop on the execution of the plurality of commands, and resuming processing of remaining commands that have not been processed at a subsequent time slice including portions of commands that have not been processed, in accordance with embodiments of the present disclosure. Processing is resumed for remaining commands that have not been processed in a subsequent time slice, wherein currently executed commands that are halted are executed from a suspended state, such that only portions of commands that have not been processed are executed in the subsequent time slice. As previously described in relation to FIG. 6B, rendering command buffer 690 includes five commands (e.g., commands C-0 through C-4) used for rendering objects and/or executing synchronous compute kernels when rendering a corresponding image frame for a corresponding application (e.g., App-0). The set of time slices 660 for App-0 includes time slice 660-1, time slice 660-2 . . . time slice 660-N (not shown). Other time slices for other applications are interleaved within the set of time slices 660 for App-0 to provide defined, and frequency and predictable access to the GPU used for processing commands.

At the end 661 of the time slice 660-1 for App-0, a process 655 of halting execution of the plurality of commands used for generating a corresponding image frame is performed. Specifically, execution of the plurality of commands in the one or more rendering command buffers (e.g., buffer 690) is halted (e.g., perform a hard stop). As shown, commands C-0 and C-1 are executed to completion in time slice 660-1 for App-0. On the other hand, command C-2 is currently executing at the end 661 of time slice 660-1, and is not completed. Command C-2 will resume processing from a suspended state at the subsequent time slice 660-2. As such, a GPU configuration is preserved during processing of the last executed command from the plurality of commands, wherein the last executed command is command C-2. As such, the hardware context of the corresponding GPU resource used for executing the plurality of commands is preserved during the execution of command C-2 (e.g., at the end 661 of time slice 660-1). The GPU configuration that is preserved is restored before commands are executed during the subsequent time slice 660-2 in the set of time slices allocated to App-0. As such, the GPU configuration is used when resuming to process (operation 657) in the subsequent time slice 660-2 one or more remaining commands (i.e., commands C-2, C-3, and C-4) in the plurality of commands that have not been processed in association with time slice 660-1. In particular, command C-2 is executed from its suspended state during the subsequent time slice 660-2, such that execution of command C-2 resumes where it was halted at the end 661 of time slice 660-1.

The GPU resource may also be used for rendering asynchronous compute (e.g. executing asynchronous compute kernels) simultaneously with the execution of commands in the rendering command buffers when rendering a corresponding image frame. As previously described, one or more commands may be loaded into one or more asynchronous compute command buffers. The one or more commands in the one or more asynchronous compute command buffers are processed by the GPU resource within the first time slice being allocated to the first application.

At the end of the first time slice being allocated to the first application, the processing of the one or more commands from the one or more asynchronous compute command buffers is suspended. In addition, a state is preserved of the processing of the one or asynchronous compute. That is, a state of the processing of the one or more commands from the one or more asynchronous compute command buffers is preserved. Also, the processing of the one or more commands is resumed in the second time slice using the state that is preserved.

Figure 7:
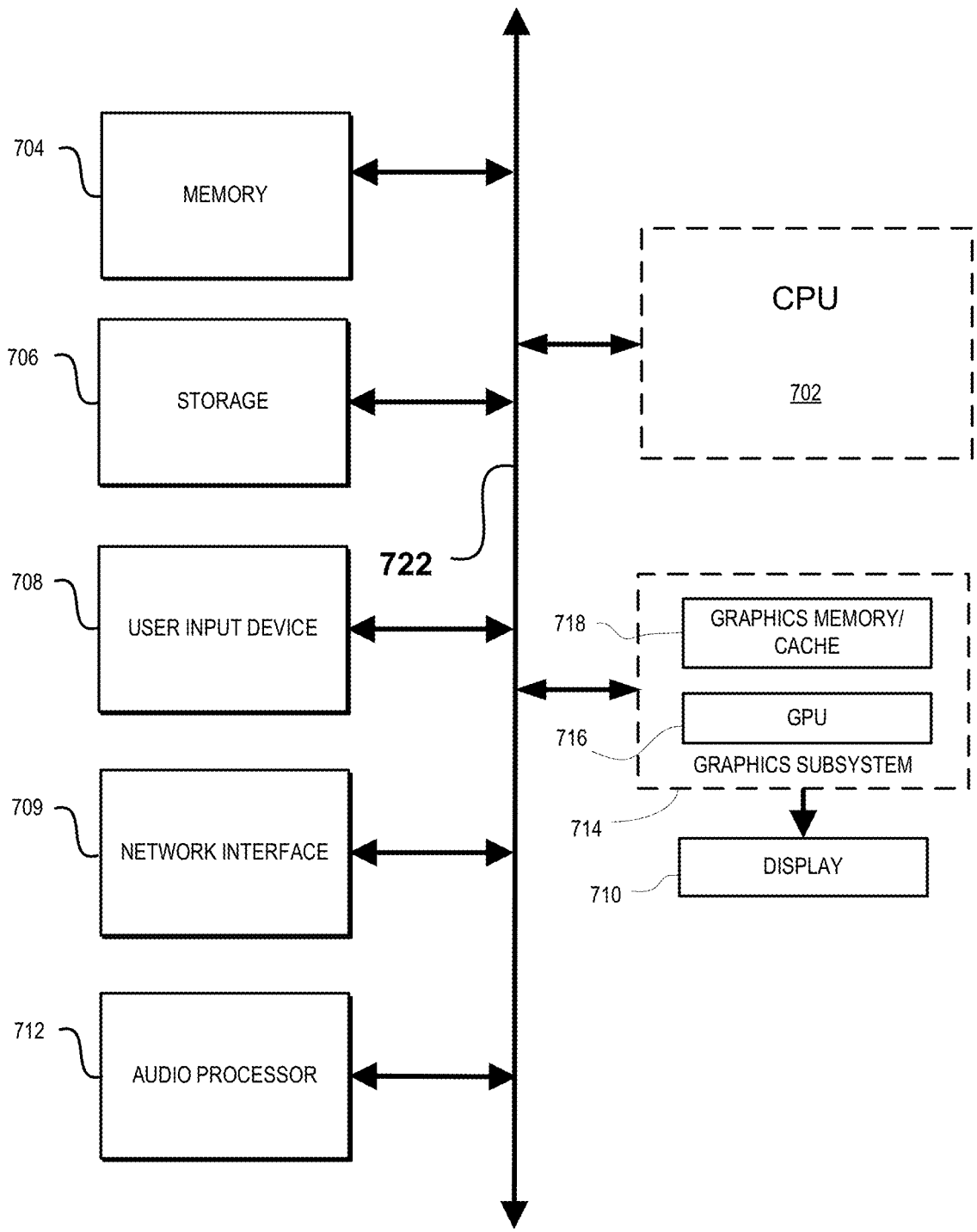
FIG. 7 illustrates components of an example device that can be used to perform aspects of the various embodiments of the present disclosure.

FIG. 7 illustrates components of an example device 700 that can be used to perform aspects of the various embodiments of the present disclosure. For example, FIG. 7 illustrates an exemplary hardware system suitable for multi-tenancy for real-time applications, including the sharing of a GPU resource between one or more applications when performing rendering of objects and/or synchronous compute operations and/or asynchronous compute operations, in accordance with embodiments of the present disclosure. This block diagram illustrates a device 700 that can incorporate or can be a personal computer, a server computer, gaming console, mobile device, or other digital device, each of which is suitable for practicing an embodiment of the invention. Device 700 includes a central processing unit (CPU) 702 for running software applications and optionally an operating system. CPU 702 may be comprised of one or more homogeneous or heterogeneous processing cores.

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 704 stores applications and data for use by the CPU 702 and GPU 716. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 709 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, graphics subsystem including GPU 716, memory 704, data storage 706, user input devices 708, network interface 709, and audio processor 712 are connected via one or more data buses 722.

A graphics subsystem 714 is further connected with data bus 722 and the components of the device 700. The graphics subsystem 714 includes a graphics processing unit (GPU) 716 and graphics memory 718. Graphics memory 718 includes a display memory (e.g. a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by a projection system (not shown). Display device 710 can be any device capable of displaying visual information in response to a signal from the device 700, including CRT, LCD, plasma, and OLED displays. Device 700 can provide the display device 710 with an analog or digital signal, for example.

Other embodiments for optimizing the graphics subsystem 714 could include multi-tenancy GPU operations where a GPU instance is shared between multiple applications, and distributed GPUs supporting a single game. The graphics subsystem 714 could be configured as one or more processing devices.

For example, the graphics subsystem 714 may be configured to perform multi-tenancy GPU functionality, wherein one graphics subsystem could be implementing graphics and/or rendering pipelines for multiple games, in one embodiment. That is, the graphics subsystem 714 is shared between multiple games that are being executed.

In other embodiments, the graphics subsystem 714 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for multi-tenancy for real-time applications, and more specifically to sharing of a graphics processing unit (GPU) between multiple applications to perform synchronous operations and/or asynchronous operations.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
dividing each of a plurality of frame periods into a plurality of time slices;
allocating a graphics processing unit (GPU) resource between a plurality of applications, such that each of the plurality of applications is allocated a corresponding set of time slices over the plurality of frame periods;
allocating a time slice in the plurality of time slices to an application for the each of the plurality of frame periods, such that the application is allocated a set of time slices over the plurality of frame periods;
processing by the GPU resource a plurality of commands in a first time slice in the set of time slices for a first frame period, wherein the plurality of commands is located in one or more rendering command buffers for the application;
halting at an end of the first time slice execution of the plurality of commands in the one or more rendering command buffers including halting a currently executing command, wherein one or more remaining commands have not been processed to completion;
preserving a GPU configuration for the plurality of commands;
restoring the GPU configuration in a second time slice of the set of time slices; and
resuming execution of the one or more remaining commands such that the currently executing command is executed from a beginning of the currently executing command.

2. The method of claim 1, further comprising:
determining that the plurality of commands has not been fully executed at the end of the first time slice.

3. The method of claim 1, further comprising:
halting a plurality of currently executing commands in the first time slice; and
executing in the second time slice each of the plurality of currently executing commands from a corresponding beginning of a corresponding currently executing command.

4. The method of claim 3, wherein the preserving the GPU configuration includes:
preserving the GPU configuration at a point before processing the plurality of currently executing commands by the GPU resource.

5. The method of claim 1, wherein each of the plurality of commands is a corresponding synchronous command.

6. The method of claim 1, wherein the preserving the GPU configuration includes:
preserving a hardware context for the GPU resource.

7. The method of claim 1,
wherein the plurality of commands is associated with one or more draw calls used for rendering an image frame for the application.

8. A method, comprising:
dividing each of a plurality of frame periods into a plurality of time slices;
allocating a graphics processing unit (GPU) resource between a plurality of applications, such that each of the plurality of applications is allocated a corresponding set of time slices over the plurality of frame periods;
allocating a time slice in the plurality of time slices to an application for the each of the plurality of frame periods, such that the application is allocated a set of time slices over the plurality of frame periods;
processing by the GPU resource a plurality of commands in a first time slice in the set of time slices for a first frame period, wherein the plurality of commands is located in one or more rendering command buffers and is associated with one or more draw calls used for rendering an image frame for the application;
halting at an end of the first time slice execution of the plurality of commands in the one or more rendering command buffers including halting a currently executing command in a suspended state such that a first portion of the currently executing command has finished processing and a second portion of the currently executing command has not been processed, wherein one or more remaining commands have not been processed to completion;
preserving a GPU configuration for the plurality of commands;
restoring the GPU configuration in a second time slice of the set of time slices; and
resuming execution of the one or more remaining commands such that the currently executing command is executed beginning from the suspended state to process the second portion of the currently executing command.

9. The method of claim 8,
wherein the first portion of the currently executing command is executed only once by the GPU resource.

10. The method of claim 8, further comprising:
determining that the plurality of commands has not been fully executed at the end of the first time slice.

11. The method of claim 8, further comprising:
halting a plurality of currently executing commands in a plurality of suspended states in the first time slice; and
executing in the second time slice each of the plurality of currently executing commands beginning from a corresponding suspended state of a corresponding currently executing command.

12. The method of claim 8, wherein the preserving the GPU configuration includes:
preserving the GPU configuration at the end of the first time slice.

13. The method of claim 8, wherein each of the plurality of commands is a corresponding synchronous command.

14. The method of claim 8, wherein the preserving the GPU configuration includes:
preserving a hardware context for the GPU resource.

15. A non-transitory computer-readable medium storing a computer program for performing a method, the computer-readable medium comprising:
program instructions for dividing each of a plurality of frame periods into a plurality of time slices;
program instructions for allocating a graphics processing unit (GPU) resource between a plurality of applications, such that each of the plurality of applications is allocated a corresponding set of time slices over the plurality of frame periods;
program instructions for allocating a time slice in the plurality of time slices to an application for the each of the plurality of frame periods, such that the application is allocated a set of time slices over the plurality of frame periods;
program instructions for processing by the GPU resource a plurality of commands in a first time slice in the set of time slices for a first frame period, wherein the plurality of commands is located in one or more rendering command buffers for the application;

program instructions for halting at an end of the first time slice execution of the plurality of commands in the one or more rendering command buffers including halting a currently executing command, wherein one or more remaining commands have not been processed to completion;

program instructions for preserving a GPU configuration for the plurality of commands;

program instructions for restoring the GPU configuration in a second time slice of the set of time slices; and program instructions for resuming execution of the one or more remaining commands such that the currently executing command is executed from a beginning of the currently executing command.

16. The non-transitory computer-readable medium of claim 15, further comprising:

program instructions for determining that the plurality of commands has not been fully executed at the end of the first time slice.

17. The non-transitory computer-readable medium of claim 15, further comprising:

program instructions for halting a plurality of currently executing commands in the first time slice; and program instructions for executing in the second time slice each of the plurality of currently executing commands from a corresponding beginning of a corresponding currently executing command.

18. The non-transitory computer-readable medium of claim 17, wherein the program instructions for preserving the GPU configuration includes:

program instructions for preserving the GPU configuration at a point before processing the plurality of currently executing commands by the GPU resource.

19. The non-transitory computer-readable medium of claim 15, wherein in the method each of the plurality of commands is a corresponding synchronous command.

20. The non-transitory computer-readable medium of claim 15, wherein the program instructions for preserving the GPU configuration includes:

program instructions for preserving a hardware context for the GPU resource.

* * * * *